United States Patent
Veasy

(10) Patent No.: US 11,718,975 B2
(45) Date of Patent: Aug. 8, 2023

(54) WORK VEHICLE MATERIAL MANAGEMENT USING MOLDBOARD GATES

(71) Applicant: DEERE & COMPANY, Moline, IL (US)

(72) Inventor: David A Veasy, Dubuque, IA (US)

(73) Assignee: Deere & Company, Moline, IL (US)

( * ) Notice: Subject to any disclaimer, the term of this patent is extended or adjusted under 35 U.S.C. 154(b) by 840 days.

(21) Appl. No.: 16/592,530

(22) Filed: Oct. 3, 2019

(65) Prior Publication Data

US 2021/0102356 A1 Apr. 8, 2021

(51) Int. Cl.
*E02F 3/84* (2006.01)
*E02F 9/20* (2006.01)
*E02F 3/815* (2006.01)
*B62D 53/04* (2006.01)

(52) U.S. Cl.
CPC .............. *E02F 3/84* (2013.01); *B62D 53/045* (2013.01); *E02F 3/8155* (2013.01); *E02F 3/847* (2013.01); *E02F 9/2095* (2013.01)

(58) Field of Classification Search
CPC ............ E02F 3/84; E02F 3/847; E02F 3/8155
See application file for complete search history.

(56) References Cited

U.S. PATENT DOCUMENTS

| | | | | |
|---|---|---|---|---|
| 1,825,434 A | * | 9/1931 | Wilson | E02F 3/7686 172/782 |
| 1,843,260 A | * | 2/1932 | Arnold | E02F 3/7686 172/782 |
| 1,871,473 A | * | 8/1932 | Schmid | E02F 3/7686 172/782 |
| 1,877,365 A | * | 9/1932 | Scheffold | E02F 3/7686 172/782 |
| 2,050,282 A | * | 8/1936 | Conway | E02F 3/7686 172/150 |
| 2,205,588 A | * | 6/1940 | Arndt | E02F 3/844 172/782 |
| 2,284,463 A | * | 5/1942 | Wilson | E02F 3/7659 172/782 |
| 2,312,255 A | * | 2/1943 | Lowdermilk | E02F 3/7686 172/182 |

(Continued)

FOREIGN PATENT DOCUMENTS

DE 102017204315 A1 9/2018

OTHER PUBLICATIONS

German Search Report issued in application No. DE102020210298.8 dated Jun. 9, 2021 (10 pages).

*Primary Examiner* — Jamie L McGowan

(57) ABSTRACT

A work vehicle comprising a material management system using moldboard gates. A sensor is configured to generate a signal indicative of a ground feature and a location of the ground feature. A moldboard is coupled to the work vehicle and is configured to move a ground material. A gate is coupled to the moldboard and a gate actuator is coupled to the gate. The gate actuator is configured to move the gate to an open position, a closed position, or to a position in between. A controller which is in communication with the sensor is configured to receive the signal indicative of the ground feature and the location and control the gate actuator to move the gate based on the ground feature and the location.

2 Claims, 7 Drawing Sheets

(56) References Cited

U.S. PATENT DOCUMENTS

| | | | | |
|---|---|---|---|---|
| 2,313,342 A * | 3/1943 | Hoover | E02F 3/7659 172/26 |
| 2,321,401 A * | 6/1943 | Le Grand | E02F 3/7686 172/388 |
| 2,594,727 A * | 4/1952 | Burggren | E02F 3/815 172/815 |
| 2,646,633 A * | 7/1953 | Jahn | E02F 3/7659 172/815 |
| 3,231,991 A * | 2/1966 | Wandscheer | E01H 5/065 37/232 |
| 3,348,322 A * | 10/1967 | Stewart | E02F 3/7659 172/477 |
| 3,366,081 A * | 1/1968 | Geiss | E02F 3/783 172/784 |
| 3,726,347 A * | 4/1973 | Hyman | A01B 13/16 172/668 |
| 3,786,871 A * | 1/1974 | Long | E02F 3/845 172/793 |
| 3,887,012 A * | 6/1975 | Scholl | G01C 15/006 356/138 |
| 3,900,073 A * | 8/1975 | Crum | E02F 3/7618 116/300 |
| 4,162,708 A * | 7/1979 | Johnson | E02F 3/765 33/624 |
| 4,372,617 A * | 2/1983 | Zamboni | E01H 4/023 299/24 |
| 4,924,374 A * | 5/1990 | Middleton | E02F 3/847 172/430 |
| 5,327,345 A * | 7/1994 | Nielsen | E01C 19/006 701/50 |
| 5,377,766 A * | 1/1995 | Klinger | E02F 3/962 172/382 |
| 5,488,788 A * | 2/1996 | Durbin | B60S 9/10 172/795 |
| 6,152,238 A * | 11/2000 | Ferrell | E02F 3/847 701/50 |
| 6,463,683 B2 * | 10/2002 | Skwarchuk | E01H 5/066 37/274 |
| 6,836,982 B1 * | 1/2005 | Augustine | E02F 9/205 701/50 |
| 7,051,819 B1 * | 5/2006 | Schenk | E01H 1/003 172/784 |
| 7,407,016 B1 * | 8/2008 | Kvalo | E02F 3/8152 172/784 |
| 7,647,983 B2 * | 1/2010 | Gharsalli | E02F 3/847 172/793 |
| 7,730,644 B2 * | 6/2010 | Frey | E01H 5/066 37/274 |
| 9,228,316 B2 | 1/2016 | Staade et al. | |
| 9,938,689 B2 | 4/2018 | Chaston et al. | |
| 10,030,357 B1 | 7/2018 | Horstman | |
| 10,066,367 B1 * | 9/2018 | Wang | E02F 9/265 |
| 10,753,066 B2 * | 8/2020 | Ono | E02F 9/262 |
| 10,759,337 B2 | 9/2020 | Kamimae et al. | |
| 11,067,688 B2 * | 7/2021 | Matsuura | G01S 15/931 |
| 2002/0166267 A1 * | 11/2002 | McGugan | E02F 9/2004 37/348 |
| 2003/0000714 A1 * | 1/2003 | Horner | E02F 3/8155 172/781 |
| 2010/0186267 A1 * | 7/2010 | Kotila | E01H 5/066 37/281 |
| 2012/0236142 A1 * | 9/2012 | Enix | E02F 9/262 348/148 |
| 2014/0180444 A1 | 6/2014 | Edara et al. | |
| 2017/0358088 A1 * | 12/2017 | Akselrod | G06T 7/13 |
| 2018/0354415 A1 | 12/2018 | Kamimae et al. | |
| 2018/0355569 A1 | 12/2018 | Kamimae et al. | |
| 2019/0024340 A1 | 1/2019 | Ono | |
| 2019/0106862 A1 | 4/2019 | Ono et al. | |
| 2022/0091271 A1 * | 3/2022 | Iwase | G01S 17/86 |

* cited by examiner

WORK VEHICLE MATERIAL MANAGEMENT USING MOLDBOARD GATES

FIELD OF THE DISCLOSURE

The present disclosure generally relates to work vehicles, such as motor graders, and more particularly to a moldboard gate for a work vehicle.

BACKGROUND OF THE DISCLOSURE

Work vehicles such as motor graders are generally used to control the grade of a surface. Motor graders are sometimes used for snow removal. Motor graders may have a main blade, sometimes referred to as a moldboard.

SUMMARY OF THE DISCLOSURE

In one embodiment, a work vehicle is disclosed. The work vehicle comprises a sensor configured for generating a signal indicative of a ground feature and a location of the ground feature. A moldboard is coupled to the work vehicle and is configured to move a ground material. A gate is coupled to the moldboard and a gate actuator is coupled to the gate. The gate actuator is configured to move the gate to an open position, a closed position, or to a position in between. A controller is in communication with the sensor and is configured to receive the signal indicative of the ground feature and the location. The controller controls the gate actuator to move the gate to one of the open position, the closed position, or the position in between based on the ground feature and the location.

In another embodiment, a motor grader is disclosed. The motor grader comprises a frame. A drawbar assembly is coupled to the frame. A circle drive assembly is coupled to the drawbar assembly. A ground engaging device is configured to support the frame above a ground. A sensor is configured for generating a signal indicative of a ground feature and a location of the ground feature. A moldboard is coupled to the circle drive assembly and configured to move a ground material. A gate is further coupled to the moldboard. A gate actuator is coupled to the gate and is configured to move the gate to an open position, a closed position, or to a position in between. A controller is in communication with the sensor and is configured to receive the signal indicative of the ground feature and the location. The controller controls the gate actuator to move the gate to the open position, the closed position, or the position in between based on the ground feature and the location.

In yet another embodiment, a work vehicle is disclosed. The work vehicle comprises a frame. A drawbar assembly is coupled to the frame. A circle drive assembly is coupled to the drawbar assembly. A ground engaging device is configured to support the frame above a ground. A sensor is configured for generating a signal indicative of a ground feature and a location of the ground feature. A global positioning system is configured to provide a work vehicle location. A moldboard is coupled to the circle drive assembly and configured to move a ground material. A gate is further coupled to the moldboard. A gate actuator is coupled to the gate and configured to move the gate to an open position, a closed position, or to a position in between. An operator interface is configured to receive an operator input indicative of a desired ground feature, a desired location from the work vehicle location, and a desired gate position. A first actuator is coupled to the drawbar assembly and the frame and configured to raise and lower the moldboard. A second actuator is coupled to the circle drive assembly and configured to rotate the moldboard. A controller is in communication with the sensor, the global positioning system, and the operator interface. The controller is configured to receive the signal indicative of the ground feature and the location. The controller compares the work vehicle location to the location and controls the gate actuator, the first actuator, and the second actuator to move the gate to the desired position when the ground feature and the location comparison match the desired ground feature and the desired location from the work vehicle location.

Other features and aspects will become apparent by consideration of the detailed description and accompanying drawings.

BRIEF DESCRIPTION OF THE DRAWINGS

FIG. 5 is a zoomed in partial side view of the gate of the work vehicle of FIG. 1 in a position in between.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

As used herein, unless otherwise limited or modified, lists with elements that are separated by conjunctive terms (e.g., "and") and that are also preceded by the phrase "at least one of" or "one or more of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

DETAILED DESCRIPTION

Figure 1:
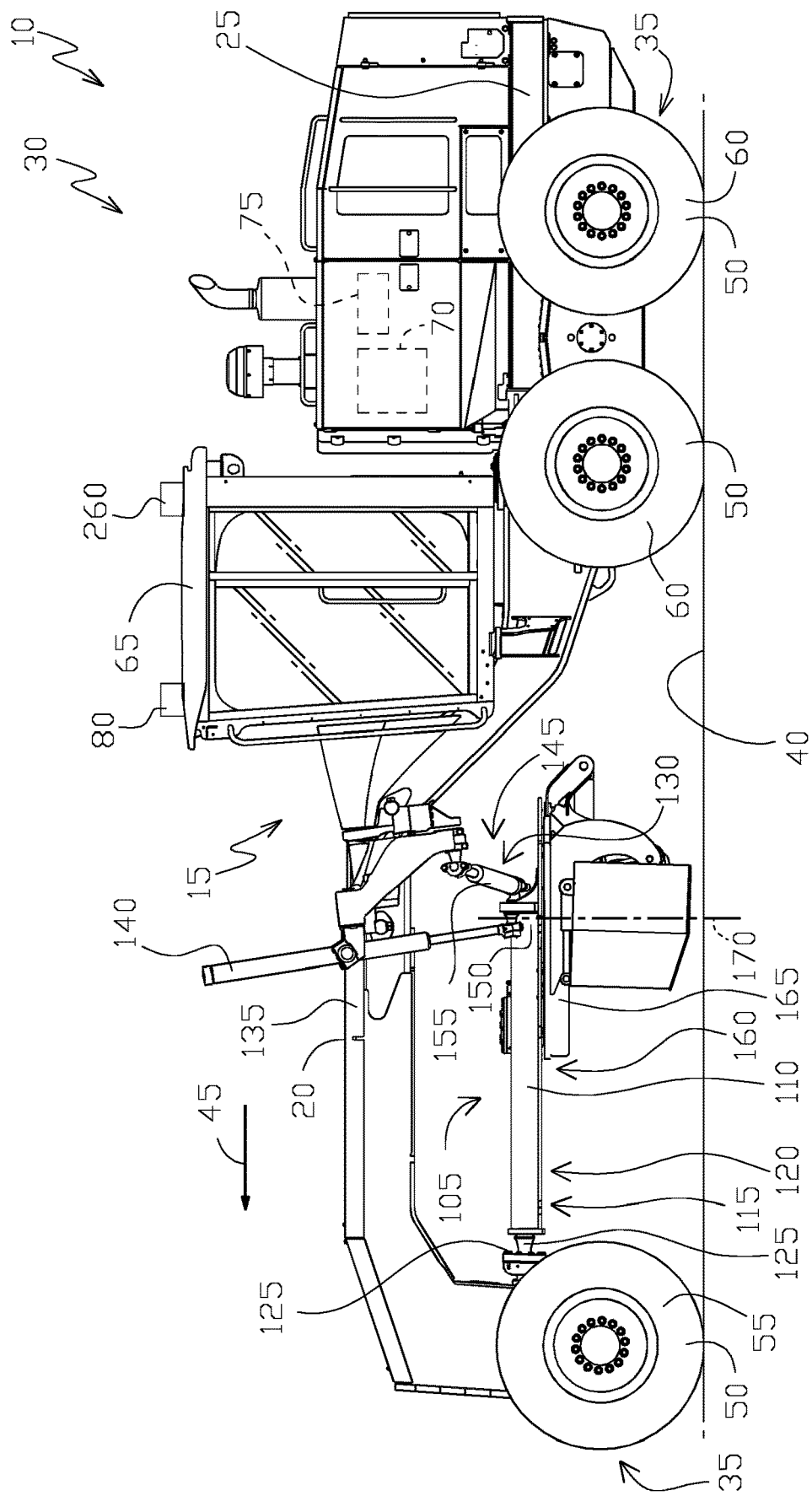
FIG. 1 is a side view of a work vehicle with a gate.

FIG. 1 illustrates a work vehicle 10 having a frame 15 that includes a front frame 20 and a rear frame 25. The work vehicle 10 is illustrated as a motor grader 30. Other types of work vehicles 10 are contemplated by this disclosure including skid steers, compact track loaders, and crawlers or bulldozers, for example. At least one ground engaging device 35 is coupled to the front frame 20 and the rear frame 25 and configured to support the front frame 20 and the rear frame 25 above the ground 40 and to move the work vehicle 10 along the ground 40 in any direction including a forward direction 45. The illustrated ground engaging device 35 is a plurality of wheels 50. Alternatively, the ground engaging device 35 may be tracks (not shown). The plurality of wheels 50 include front wheels 55 for supporting the front frame 20 and left and right tandem sets of rear wheels 60 for supporting the rear frame 25.

An operator station 65 is coupled to the frame 15. A power plant 70 (e.g., a diesel engine) is also coupled to the frame 15 to power a drive train and one or more hydraulic pumps 75, which pressurize hydraulic fluid in a hydraulic circuit to move hydraulic actuators.

Figure 2:
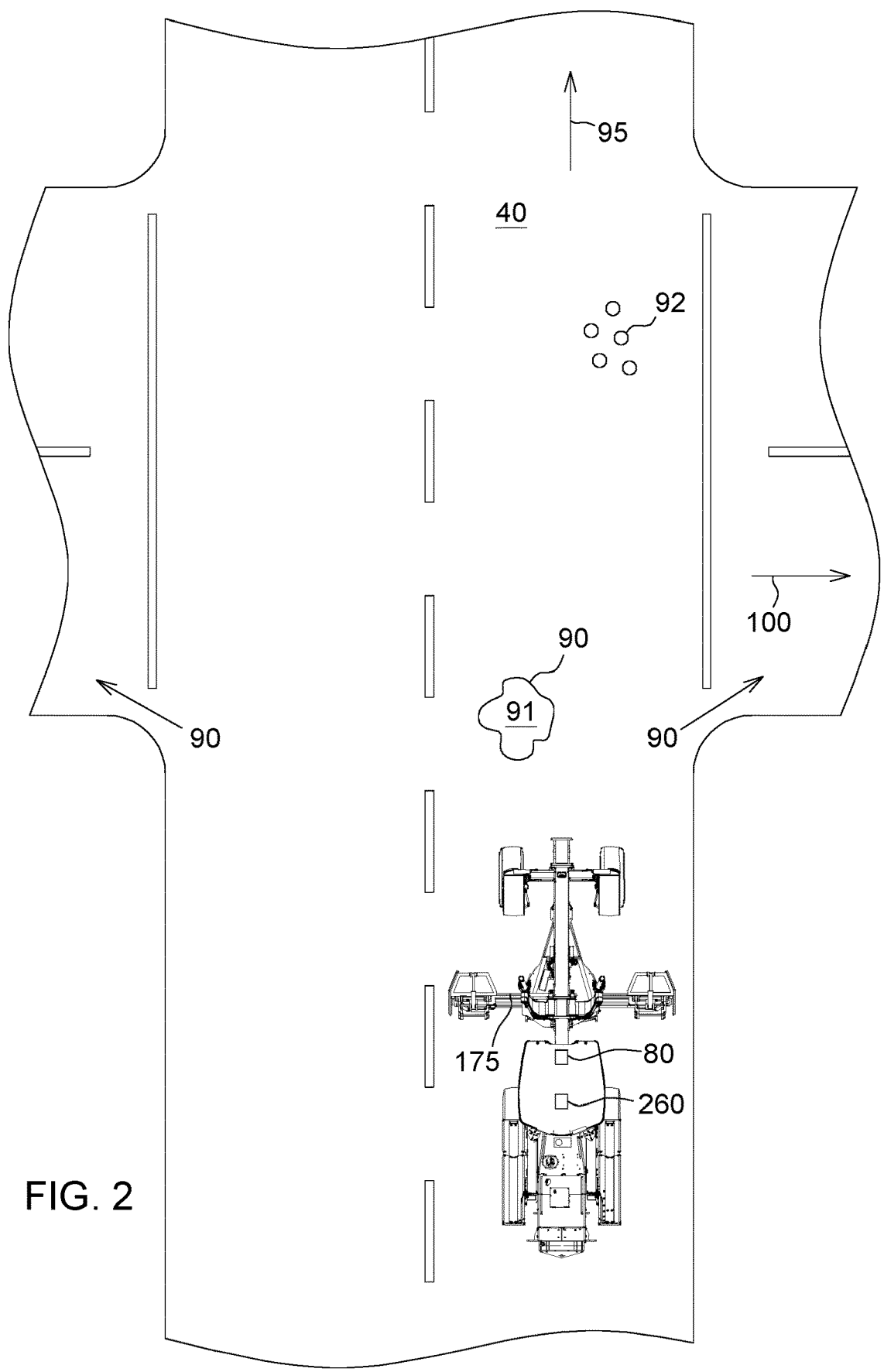
FIG. 2 is an overhead view of the work vehicle of FIG. 1.

With reference to FIG. 2, a sensor 80 is coupled to the work vehicle 10. The sensor 80 is configured for generating a signal 85 (FIG. 7) indicative of a ground feature 90 and a location 91 of the ground feature 90 on the ground 40. The sensor 80 may be radar, lidar, a camera, or other sensor. The ground feature 90 may be an alternate path, a high portion of the path such as a bump or hill, a low portion of the path such as a pothole, ground material 92 (e.g., dirt, rock, sand, snow) or other feature on the ground 40. For example, the work vehicle 10 may move the ground material 92 along a first path 95 and the ground feature 90 may be a second path 100 that is connected to the first path 95. The first path 95 may be a road and the second path 100 may be another road or a driveway for example. An operator may be moving snow and may not want to block the second path 100 or road with snow while moving snow on the first path 95 or road.

Referring to FIG. 1, a drawbar assembly 105 or draft frame is coupled to the frame 15. A drawbar 110 of the drawbar assembly 105 is mounted to a front location 115 of the front frame 20, having a forward end 120 coupled to the front frame 20 by a ball and socket arrangement 125 and having opposite left and right rear regions 130 suspended from an elevated central section 135 of the front frame 20. Left and right first actuators 140 support the left and right rear regions 130 of the drawbar 110. The left and right first actuators 140 either raise or lower the drawbar 110. A side shift linkage arrangement 145 is coupled between the elevated central section 135 of the front frame 20 and a rear location 150 of the drawbar 110 and includes a side swing hydraulic actuator 155.

A circle drive assembly 160 is coupled to the drawbar assembly 105. The circle drive assembly 160 can include a rotatable circle member 165 coupled to the draft frame or drawbar assembly 105. The circle drive assembly 160 can be rotatable about a rotation axis 170 in a clockwise or counterclockwise direction.

With reference to FIG. 2, a moldboard or blade 175 is coupled to the circle drive assembly 160 (FIG. 1) of the work vehicle 10 and configured to move the ground material 92 on the ground 40. The ground material 92 may be snow, rock, sand, aggregate, or other material. While a moldboard 175 is described herein, other types of implements are contemplated by this disclosure.

Figure 3:
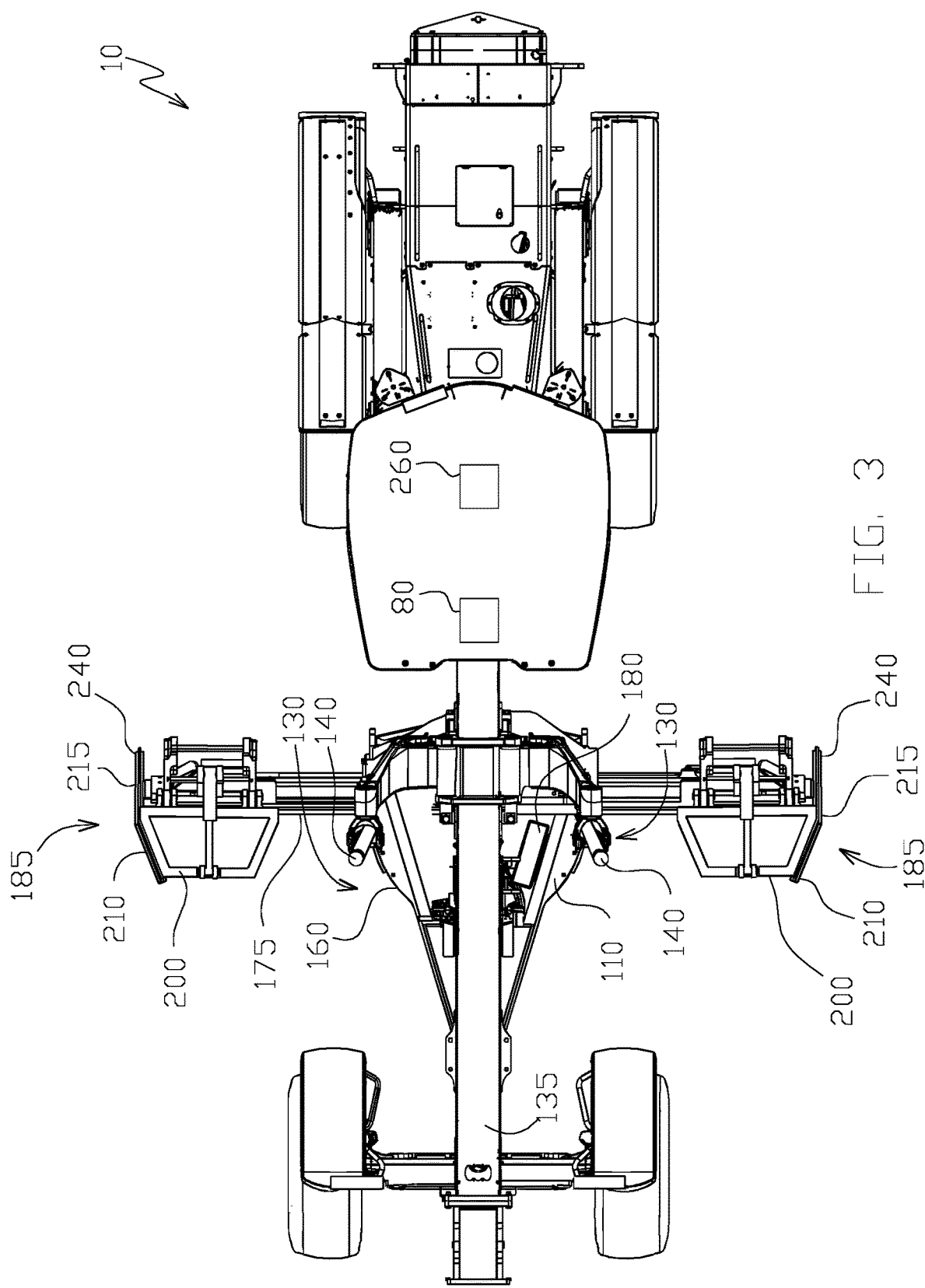
FIG. 3 is a zoomed in overhead view of the work vehicle of FIG. 1.

Referring to FIG. 3, a second actuator 180 may be coupled to the moldboard 175 or the circle drive assembly 160. The second actuator 180 is configured to rotate the moldboard 175.

Figure 4:
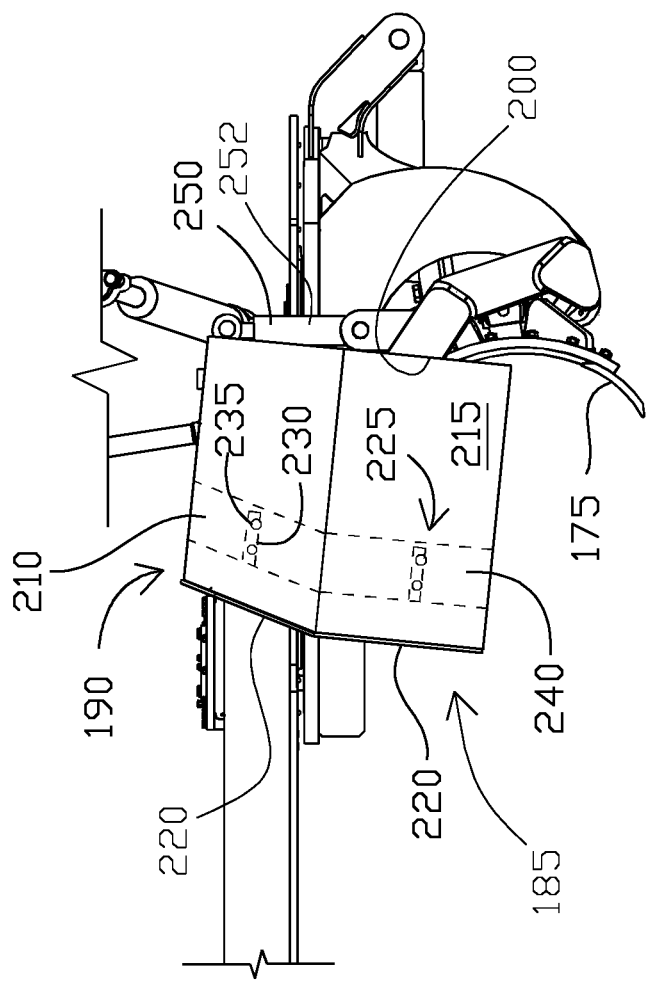
FIG. 4 is a zoomed in partial side view of the gate of the work vehicle of FIG. 1 in an open position.
Figure 5:
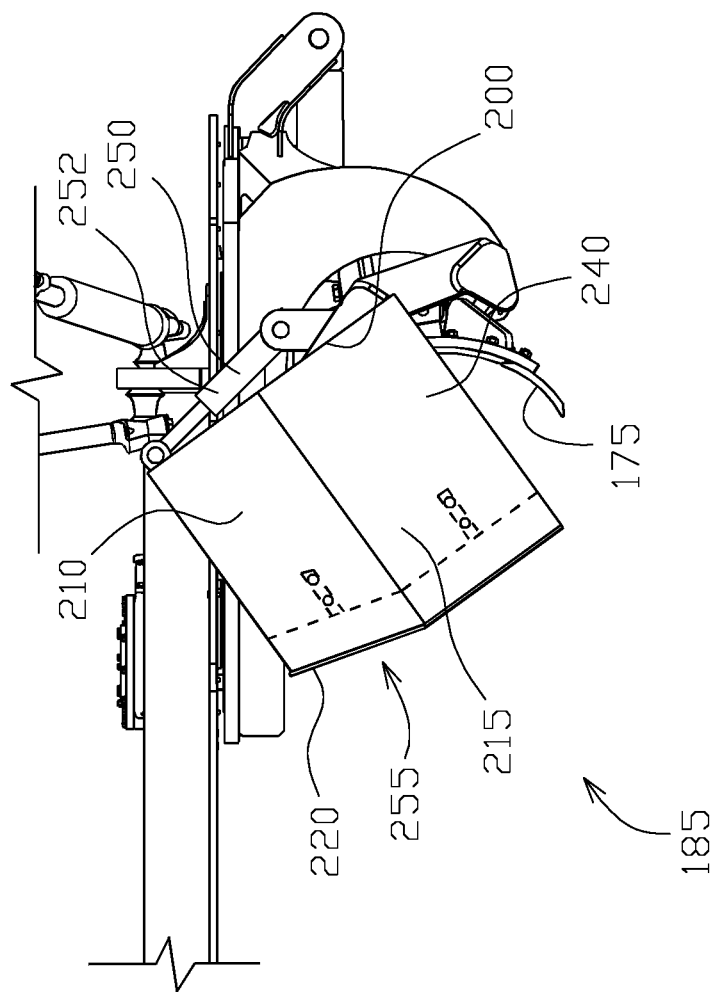

With reference to FIGS. 3-5, at least one gate 185 is coupled to the moldboard 175 and configured to move from an open position 190 to a closed position 195. In one embodiment, the gate 185 has three walls. A first wall 200 is rotatably coupled to the moldboard 175 and is positioned substantially vertical relative to the ground 40 in the open position 190 and substantially horizontal relative to the ground 40 in the closed position 195. The first wall 200 forms a top 205 of the gate 185 in the closed position 195.

A second wall 210 is coupled to the first wall 200. The second wall 210 forms a side 215 of the gate 185 in the closed position 195. The second wall 210 includes a wear plate 220 that may contact the ground 40 in the closed position 195. The wear plate 220 may be adjusted up or down in a substantially vertical position by way of an adjustment device 225 coupled to the wear plate 220 and the second wall 210. The adjustment device 225 that is shown in this embodiment is a plurality of slots 230 and fasteners 235. The second wall 210 may be angled slightly inward, toward the work vehicle 10, when the gate 185 is in the closed position 195.

A third wall 240 is coupled to the second wall 210. The third wall 240 may be angled slightly inward such that in the closed position 195, the third wall 240 may contact the moldboard 175. A protrusion 245 may be coupled to the third wall 240 that contacts the moldboard 175 in the closed position 195. The protrusion 245 may assist with properly aligning the gate 185 with the moldboard 175 in the closed position 195.

It is contemplated that a fourth wall or reinforcement member (not shown) may be coupled to the first wall 200 and the second wall 210. The gate 185 may be shaped rectangularly, spherical, or another shape.

Figure 6:
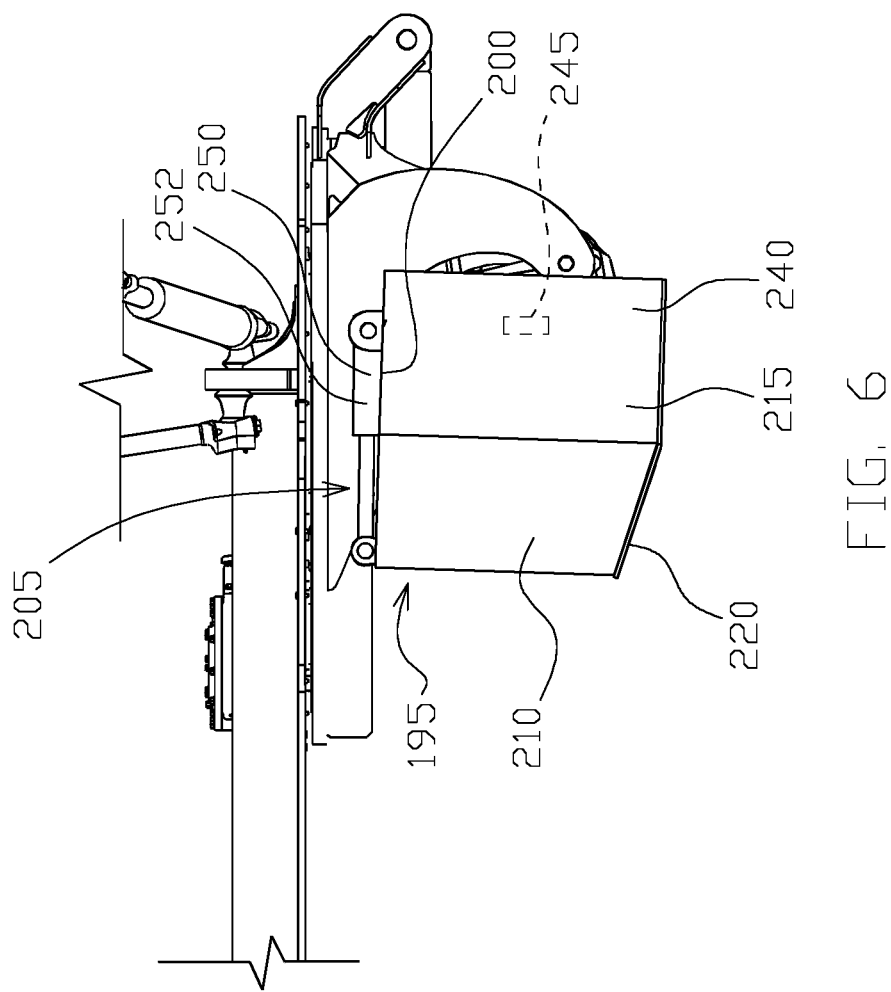
FIG. 6 is a zoomed in partial side view of the gate of the work vehicle of FIG. 1 in a closed position.

A gate actuator 250 may be coupled to the gate 185. In one embodiment, the gate actuator 250 is a hydraulic cylinder and one end of the actuator is connected to the gate 185 and another end is connected to the moldboard 175. Alternatively, the gate actuator 250 may be a pneumatic cylinder or an electronic actuator 252. The gate actuator 250 is configured to move the gate 185 to the open position 190 (FIG. 4), the closed position 195 (FIG. 6), or to a position in between 255 (FIG. 5). When the gate actuator 250 is substantially fully extended, the gate 185 will be moved to the closed position 195. When the gate actuator 250 is substantially fully retracted, the gate 185 will be moved to the open position 190. When the gate actuator 250 is partially extended, the gate 185 will be positioned such that it will be placed in between the open and closed positions 190, 195.

Figure 7:
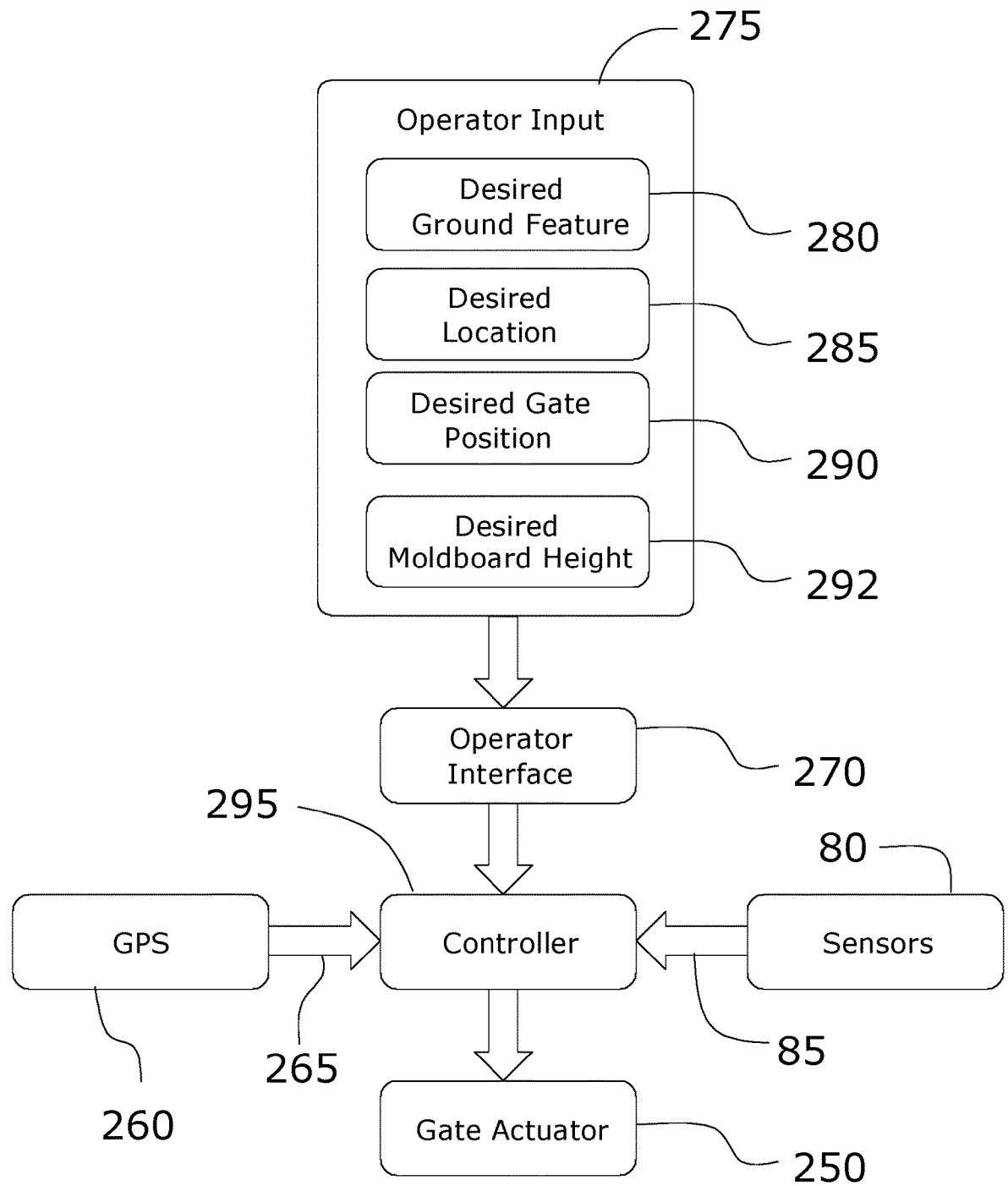
FIG. 7 is a schematic of a work vehicle control of the work vehicle of FIG. 1.

Referring to FIG. 7, a global positioning system ("GPS") 260 may be coupled to the operator station 65 or frame 15 of the work vehicle 10. The GPS 260 may be configured to provide a work vehicle location 265. The work vehicle location 265 may be associated with stored position data such as maps, geo-coordinate markers, and so on, to reconcile the real-time work vehicle location 265 in three-dimensional space with known objects and grade locations of preset locations of a work site.

An operator interface 270 may be coupled to the work vehicle 10 and positioned in the operator station 65. The operator interface 270 may be configured to receive an operator input 275 indicative of a desired ground feature 280, a desired location 285, and a desired gate position 290 for automatic control of the gate 185. The operator input 275 may also include a desired moldboard height 292. Alternatively, the operator interface 270 may be configured to receive manual operator input 275 for manual operation of the gate 185.

As used herein, a "controller" 295 is intended to be used consistent with how the term is used by a person of skill in the art, and refers to a computing component with processing, memory, and communication capabilities which is utilized to control or communicate with one or more other components. In one embodiment the controller 295 is a standalone controller 295 dedicated to control the gate actuator 250 and in some embodiments the moldboard 175, but in alternate embodiments the controller 295 may be a vehicle control unit ("VCU") which controls multiple functions of the work vehicle 10 in addition to the gate actuator 250 and the moldboard 175.

The controller 295 may be configured to receive the signal 85 from the sensor 80 and the operator input 275 from the operator interface 270 and automatically control the gate actuator 250 to move the gate 185 to the desired gate position 290 when the ground feature 90 and the location 91 matches the desired ground feature 280 and the desired location 285. For example, an operator could set the desired gate position 290 to the closed position 195 and the desired ground feature 280 to the second path 100 and then the controller will control closing the gate 185 when the work vehicle 10 is at or by the second path 100 and control opening the gate 185 after the work vehicle 10 passes the second path 100 to prevent ground material 92 from windrowing or building up and blocking the second path 100 while the work vehicle is traversing the first path 95. Alternatively, the operator could manually control the gate 185 with the operator interface 270 by providing operator input 275 to the controller 295. The controller 295 is configured to control moving the gate 185 to one of the open position 190, the closed position 195, or the position in between 255 and to control the height of the moldboard 175.

In another example, the controller 295 may control the gate actuator 250 to move the gate 185 to the closed position 195 when the ground feature 90 is the low portion to deposit the ground material 92 onto the low portion, for example to fill a pothole on a road. In yet another example, the controller 295 may control the gate actuator 250 to move the gate 185 to the open position 190 when the ground feature 90 is the high portion to deposit the ground material 92 adjacent the high portion, for example to create a windrow of the ground material 92 by removing ground material 92 from the high portion.

What is claimed is:

1. A work vehicle comprising:
   a sensor configured for generating a signal indicative of a ground feature and a location of the ground feature;
   a moldboard coupled to the work vehicle and configured to move a ground material;
   a gate coupled to the moldboard;
   a gate actuator coupled to the gate, the gate actuator configured to move the gate to an open position, a closed position, or to a position in between; and
   a controller in communication with the sensor, the controller configured to receive the signal indicative of the ground feature and the location and control the gate actuator to move the gate to one of the open position, the closed position, or the position in between based on the ground feature and the location;
   wherein the gate prevents windrow formation.

2. A work vehicle comprising:
   a frame;
   a drawbar assembly coupled to the frame;
   a circle drive assembly coupled to the drawbar assembly;
   a ground engaging device configured to support the frame above a ground;
   a sensor configured for generating a signal indicative of a ground feature and a location of the ground feature;
   a moldboard coupled to the circle drive assembly and configured to move a ground material;
   a gate coupled to the moldboard;
   a gate actuator coupled to the gate, the gate actuator configured to move the gate to an open position, a closed position, or to a position in between; and
   a controller in communication with the sensor, the controller configured to receive the signal indicative of the ground feature and the location and control the gate actuator to move the gate to the open position, the closed position, or the position in between based on the ground feature and the location;
   wherein the gate prevents windrow formation.

* * * * *